United States Patent [19]

Downey

[11] Patent Number: 4,918,647

[45] Date of Patent: Apr. 17, 1990

[54] PROGRAMMABLE INTERFACE UNIT WHICH GENERATES DEDICATED CONTROL SIGNALS IN RESPONSE TO A SINGLE CONTROL WORD

[75] Inventor: Philip A. Downey, Linlithgow, Scotland

[73] Assignee: Burr-Brown Limited, Livingston, Scotland

[21] Appl. No.: 892,324

[22] Filed: Aug. 4, 1986

[30] Foreign Application Priority Data

Apr. 5, 1986 [GB] United Kingdom ............... 8608369

[51] Int. Cl.⁴ .......................... G06F 9/06; G06F 5/00
[52] U.S. Cl. .................................. 364/900; 364/926;
364/927.99; 364/949.2; 364/933.7
[58] Field of Search ... 364/200 MS File, 900 MS File

[56] References Cited

U.S. PATENT DOCUMENTS

| | | | |
|---|---|---|---|
| 4,145,751 | 3/1979 | Carlow et al. | 364/900 |
| 4,548,161 | 10/1985 | Reisgris et al. | 119/14.17 |
| 4,611,296 | 9/1986 | Niedermayr | 364/513 |
| 4,638,451 | 1/1987 | Hester et al. | 364/900 |

FOREIGN PATENT DOCUMENTS 60-72001 4/1985 Japan.

OTHER PUBLICATIONS

"Robot Control Circuit Interfaced to a Standard Processor Card", IBM TDB, vol. 28, No. 10, Mar., 1986, pp. 4596–4597.

Primary Examiner—Thomas C. Lee
Attorney, Agent, or Firm—Victor Flores; Harry M. Weiss

[57] ABSTRACT

A unit for providing an interface between analog input signals and a digital data processing system bus includes a plurality of sample-and-hold circuits coupled to the analog input signals, a multiplexer for selecting a particular sample-and-hold circuit, and an analog-to-digital converter for providing a digital signal related to the amplitude of a selected portion of the input signal. A control circuit provides control signals for controlling the operation of the sample-and-hold circuits, the multiplexer, and the analog-to-digital converter circuit. The control circuit can receive and store signals from the data processing system and use such signals to control the operation of the interface unit.

2 Claims, 3 Drawing Sheets

PROGRAMMABLE INTERFACE UNIT WHICH GENERATES DEDICATED CONTROL SIGNALS IN RESPONSE TO A SINGLE CONTROL WORD

TECHNICAL FIELD

This invention relates generally to interface apparatus for monitoring analog input signals and for applying digitized signals, representing a selected portion of the analog input signal, to a digital system bus and, more particularly, to apparatus and method for providing a more flexible operation for the interface apparatus coupling analog input signals and a digital system bus.

BACKGROUND OF THE INVENTION

It is known in the related art to provide an interface unit, such as is shown in FIG. 3, to process analog input signals 2 and to apply a digitized version 4 of selected portions of the analog input signals to a digital system bus. The interface unit 10 can include a plurality of sample-and-hold circuits 11 for monitoring the analog input signals 2 and at controllable times storing the value of the signal then present. A multiplexer unit 12, under control of an address signal 6 can select one of the output signals from the sample-and-hold circuits 11.

The signal from the selected sample-and-hold circuit is applied to an analog-to-digital converter 13. The output signal from the analog-to-digital converter is then coupled to the system bus 3, in response to one or more control signals from the data processing unit 5 (typically a microprocessor) via line 15. The signals on the system bus 3 can be stored in memory unit 8 or can be applied directly to data processing unit 5. In either case, the data processing unit 5 can process the converted digital signals according to a program controlling the data processing unit 5.

In the prior art system shown in FIG. 3, the control signals necessary to control the operation of units 11, 12, and 13 are generated by control logic 14 and typically include the following: a signal to place sample-and-hold circuits 11 in the sample-and-hold mode at the correct time and for the correct duration; address signals to select a particular channel of the multiplexer 12; a signal for the analog-to-digital converter 13 each time a new sample is to be digitized; and a signal for the processor 5 to couple the output signals of the analog-to-digital converter 13 to the system bus 3.

In order to obtain the control signals shown in FIG. 3, two approaches have been utilized in prior art circuits, both of which utilize some form of electronic hardware to generate the necessary control signals.

Referring to FIG. 4A, the operation of an interface unit under synchronous hardware control is shown. A clock 21 associated with the interface unit activates a plurality of counter/timer circuits in unit 22. The counter/timer unit 22 provides a pattern of output signals that can be applied to decoding unit 23. The decoding unit processes the pattern of signals from the counter/timer unit 22 and provides the appropriate control signals to control the interface unit in a pre-established fashion.

FIG. 4B shows a similar prior art circuit for providing control signals in an asynchronous environment. The asynchronous timing circuit 24 (typically composed of random logic circuits such as monostable multivibrators and similar logic components) applies signals to decoding unit 25. The decoding unit 25 has the appropriate logic components to provide the control signals to control the functions of the other components of the interface unit (not shown).

In either of the above-described synchronous or asynchronous configurations, the mechanism providing the control signals comprises electronic hardware located within the interface unit, and once the circuit configuration is established the control signals are fixed and cannot easily be changed.

There has therefore existed an urgent need for an interface between analog input signals and a digital data processing unit system bus that permits the interface unit to respond to control signals from the data processing unit, which control signals establish the operating conditions of the interface unit.

SUMMARY OF THE INVENTION

It is therefore an object of the present invention to provide an improved interface unit between analog input signals and a digital system bus.

It is a further object of the present invention to provide an interface unit for which the operation can be controlled by signals from the data processing unit.

These and other objects are accomplished in accordance with a preferred embodiment of the invention by providing a unit for interfacing between analog input signals and a digital bus, such unit comprising digitizing means for digitizing a selected analog input signal; control means for controlling the digitizing means; and transfer means for transferring signals from the digital bus to the control means, the transferred signals establishing a state of the control means.

BRIEF DESCRIPTION OF THE DRAWINGS

The invention is pointed out with particularity in the appended claims. However, other features of the invention will become more apparent and the invention will be best understood by referring the the following detailed description in conjunction with the accompanying drawings in which:

DETAILED DESCRIPTION OF THE INVENTION

Figure 1A:
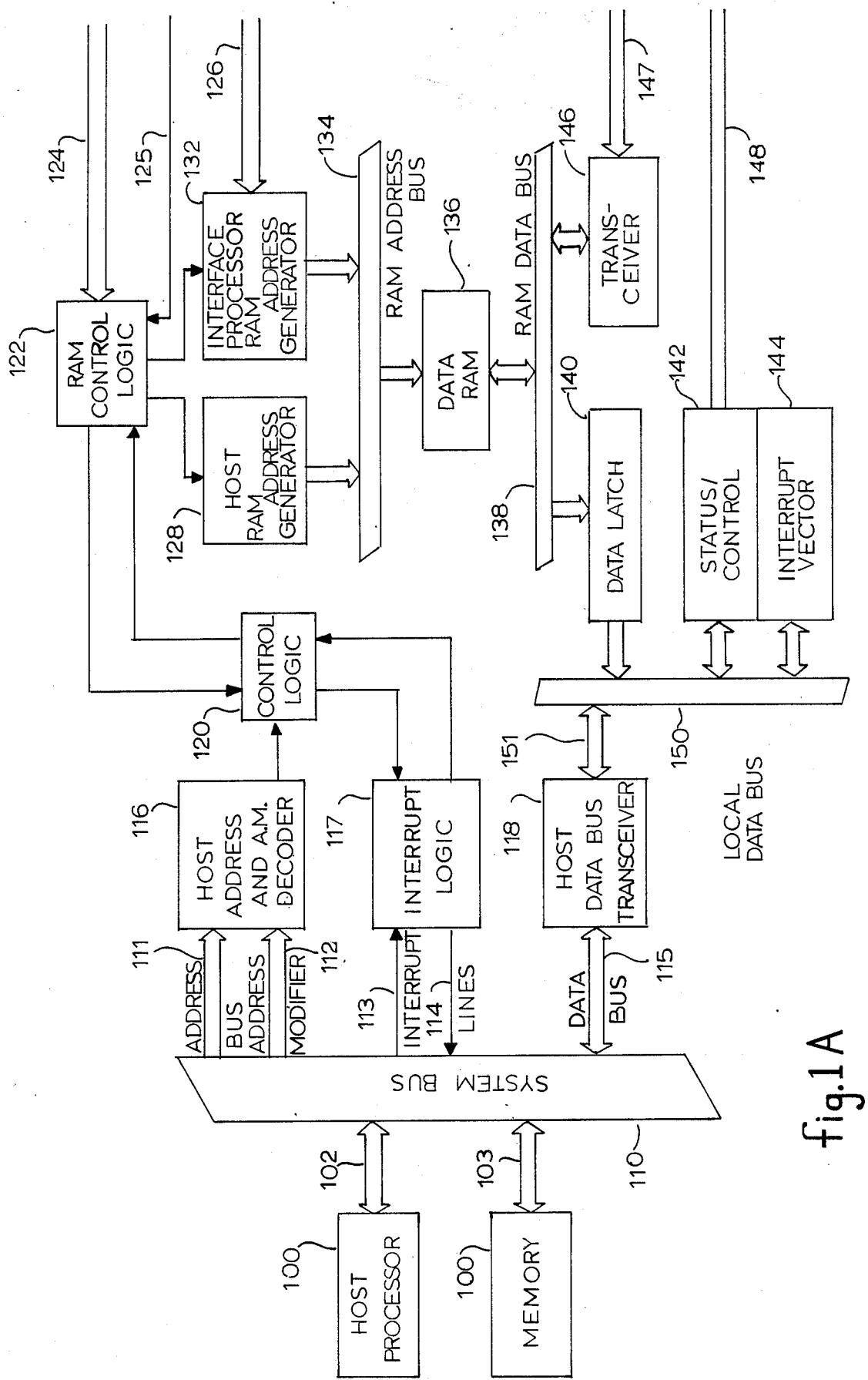
FIGS. 1A and 1B together form a detailed block diagram of a data acquisition system incorporating the interface unit of the present invention.
Figure 1B:
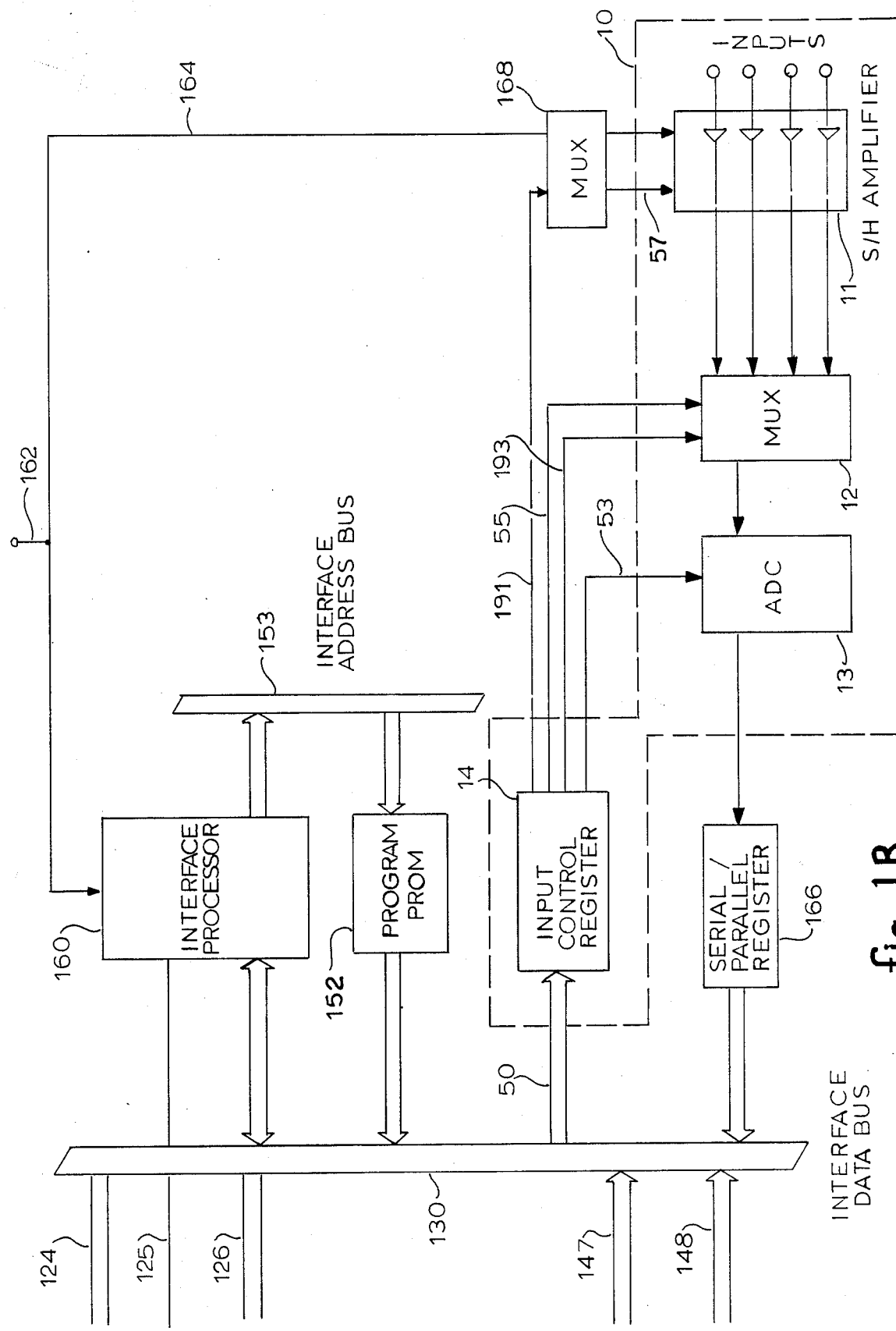

FIGS. 1A and 1B form a detailed block diagram of a data acquisition system incorporating the interface unit of the present invention. The data acquisition system comprises sampling/digitizing portion 10. Portion 10 includes sample/hold amplifiers 11, multiplexer 12, A/D converter 13, and input control register 14.

The interface unit also comprises an interface processor 160 coupled between interface data bus 130 and interface address bus 153. A program PROM 152 stores programs and/or data for controlling the operation of interface processor 160.

In a preferred embodiment, interface processor 160 is a TMS320 digital signal processor commercially available from Texas Instruments, Inc. Interface processor 160 provides the intelligence for the interface unit, and it may be programmed to offer flexible operating modes and to carry out various digital signal processing functions. It operates at sufficient speed to permit it to control directly the data acquisition operations of the sampling/digitizing portion 10, as well as perform other control operations of the interface unit.

Referring to FIG. 1A, the interface unit also comprises a data RAM 136 for temporarily storing data and instructions. Data RAM 136 is a two-port RAM which can be accessed by either the interface processor 160 or the host processor 100. Data RAM 136 is coupled to the interface data bus 130 via transceiver 146 and the RAM data bus 138. Data RAM 136 is coupled to host system bus 110 via data latch 140, local data bus 150, host data bus transceiver 118, and data bus 115.

RAM control logic 122 controls arbitration of data RAM 136 access between the interface processor 160 and the system bus 110. The interface processor 160 always has priority access.

Host RAM address generator 128 and interface processor RAM address generator are responsive to the RAM control logic 122 to generate appropriate RAM addresses on the RAM address bus 134.

The host address and address modification decoder 116, interrupt logic 117, and control logic 120 provide various addressing and control functions for the host system with respect to the interface unit.

The host processor 100 is coupled to the system bus 110 via bus segment 102. Host processor 100 may be any appropriate processor. The memory 101 supporting the host system is coupled to the system bus via bus segment 103. In a preferred embodiment, system bus 110 is a bus meeting the VME bus standard.

Field programmable logic arrays (FPLA's), and in particular programmable array logic (PAL) devices commercially available from Monolithic Memories, Inc., are used in many of the control logic circuits of the present invention, such as the host address and address modification decoder 116, the interrupt logic 117, control logic 120, host RAM address generator 128, interface processor RAM address generator 132, and AM control logic 122.

In operation, the interface unit shown in FIGS. 1A and 1B captures analog data at sampling rates determined by the interface processor 160 or by an external trigger source 162. The interface processor 160 can process the data in real time and store it in data RAM 136 for access by the host processor 100 via the system bus 110. Thus analog signals can be continuously sampled at fixed rates independent of asynchronous events in the host system such as dynamic RAM refreshing and the servicing of other tasks.

Figure 2:
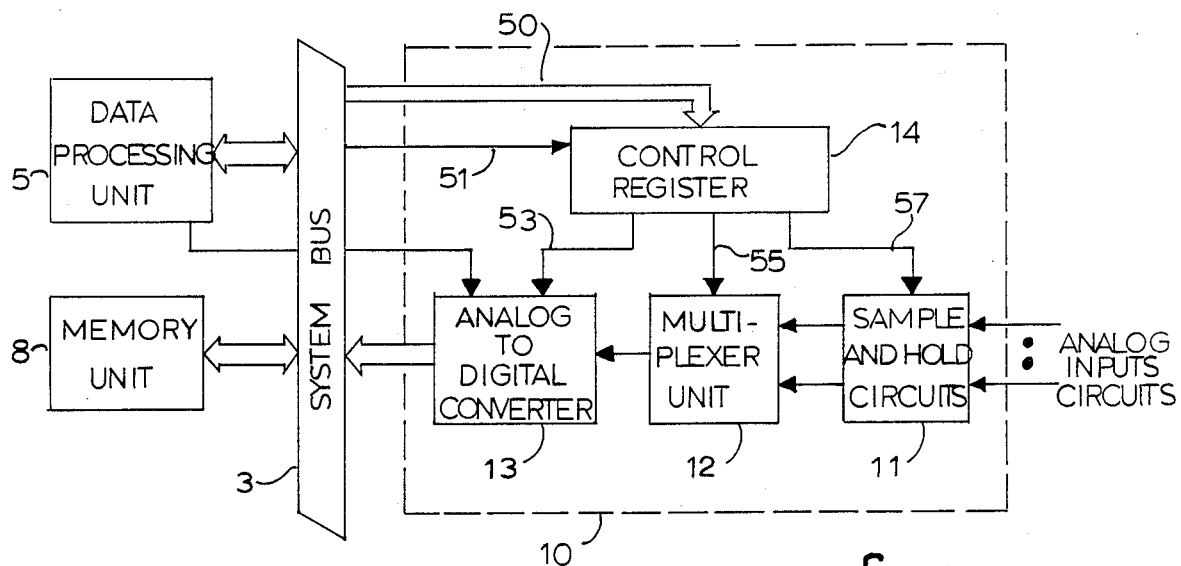
FIG. 2 is a block diagram of a preferred embodiment of the interface unit of the present invention.
Figure 3:
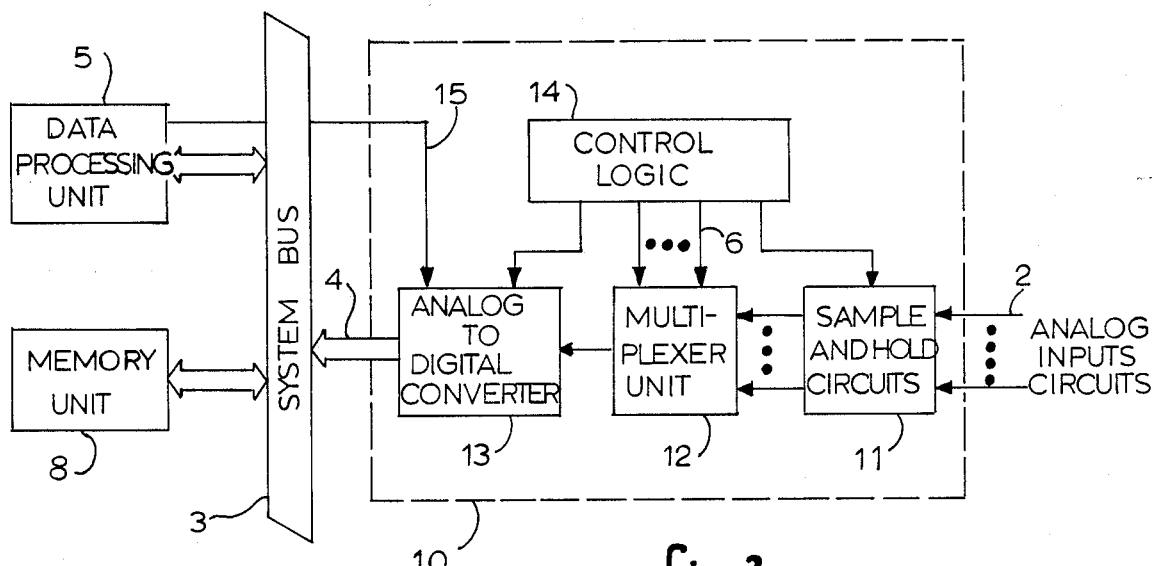
FIG. 3 is a block diagram of a prior art interface unit.
Figure 4A:
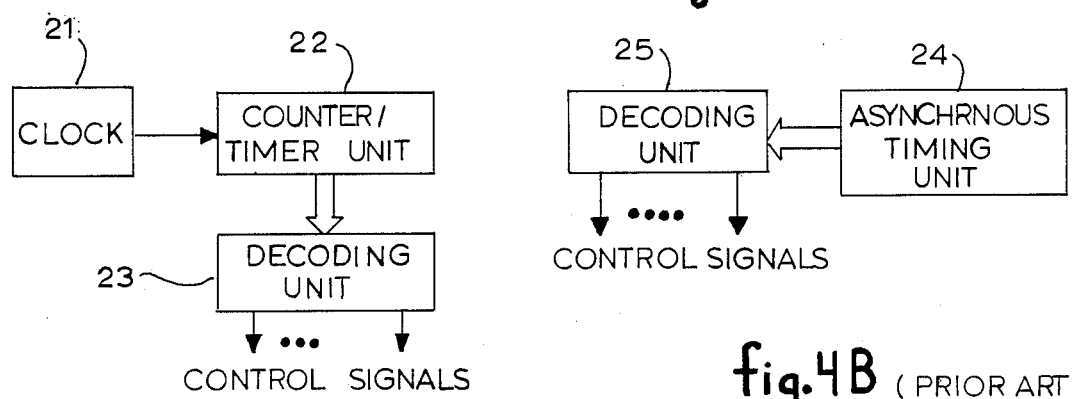
FIGS. 4A and 4B represent prior art interface control circuits.
Figure 4B:
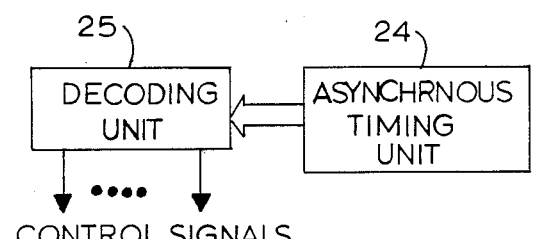

Referring now to FIG. 2, an apparatus for providing a flexible interface unit 10 is shown in a more generalized diagram. The sample-and-hold circuits 11, the multiplexer 12, and the analog-to-digital converter 13 have the same functions as previously described.

The data processing unit 5, memory unit 8, and system bus 3 may be any suitable components of the system. In the embodiment of the invention shown in FIGS. 1A and 1B, the data processing function is performed by interface processor 160. The memory function is performed by program PROM 152. And the functions performed by the system bus are carried out by the corresponding portions of the interface unit, such as interface data bus 130. However, it should be understood that data processing unit 5 could be any processor in the overall system.

Regarding FIG. 2 again, the control register 14 is coupled to the system bus 3 via control bus 50 and is also coupled to line 51 that receives a write strobe signal from the data processing unit 5.

The write strobe signal applied to the control register 14 via line 51 causes the control word present on the control bus 50 to be entered into the control register 14.

Control register 14, in response to the control word stored therein, generates output control signals on control lines 53, 55, and 57 that control the operation of the data sampling and conversion portions 11–13 of interface unit 10.

OPERATION OF PREFERRED EMBODIMENT

Still referring to FIG. 2, control register 14 generates control signals which control the interface unit 10 to determine, for example, which analog input signal is monitored, the time duration for monitoring the analog input signal, and when the analog-to-digital converter 13 processes the analog input signals.

The various control signals are generated by appropriate circuits which can be readily constructed by one skilled in the art.

There are significant advantages to using signals generated by the data processing unit, which signals are typically generated in response to suitable software instructions in the data processing unit.

One significant advantage is a reduction in logic hardware in the interface unit, thus resulting in a smaller device and reduced cost. Another advantage is a significant improvement in flexibility of operating the interface unit, since its operation can be easily modified at any time by altering the stored computer program.

It will be apparent to those skilled in the art that the disclosed method and apparatus for an improved interface unit between analog input signals and a digital system bus may be modified in numerous ways and may assume many embodiments other than the preferred from specifically set out and described above.

Accordingly, it is intended by the appended claims to cover all modifications of the invention which fall within the true spirit and scope of the invention.

What is claimed is:

1. An enhancement to a digital signal processing system provided with a system bus, a data processing unit and a memory unit respectively coupled to the system bus for developing an interface control word and for applying the interface control word to the system bus, said digital signal processing system also provided with a control register, a control transfer bus (50) coupled between the system bus and the control register for causing the interface control word to be entered into the control register, a digitizer coupled to the system bus for transmitting digitized analog input signals, the digitizer comprising a sample-and-hold circuit electronically coupled to a multiplexer unit, that in turn is coupled to an analog-to-digital converter, said enhancement to said digital processing system comprising:
   (a) a first control line coupled between the control register and the sample-and-hold circuit for delivering a first control signal generated by said control register in response to the entered interface control word for determining the time duration for monitoring an analog input signal;
   (b) a second control line coupled between the control register and the multiplexer for delivering a second control signal generated by said control register in response to the entered interface control word for determining which analog input signal is monitored; and (c) a third control line coupled between the control register and the analog-to-digital converter for delivering a third control signal generated by said control register in response to the entered interface control word for determining when the analog-to-digital converter processes an analog input signal.

2. In a digital signal processing system that includes a data processing unit coupled to a system bus, a control transfer bus coupled between said system bus and a control register for causing an interface control word to be entered into said control register, a digitizer coupled to said system bus for transmitting a digitized analog input signal, said digitizer comprising a sample-and-hold circuit electronically coupled to a multiplexer unit that in turn is coupled to an analog-to-digital converter, a method of interfacing at least one analog signal source to the system bus, the method comprising the steps of:

(a) providing a first control line coupled between the control register and the sample-and-hold circuit for delivering a first control signal for determining the time duration for monitoring an analog input signal;

(b) providing a second control line coupled between the control register and the multiplexer for delivering a second control signal for determining which analog input signal is monitored;

(c) providing a third control line coupled between the control register and the analog-to-digital converter for delivering a third control signal for determining when the analog-to-digital converter processes an analog input signal;

(d) transferring the interface control word from the system bus to an input of said control register;

(e) generating said first, second, and third control signals by said control register in response to said interface control word onto said first, second, and third control lines described in steps (a), (b) and (c) for determining the time duration for monitoring an analog input signal, determining which analog input signal is being monitored and determining when the analog-to-digital converter processes an analog input signal;

(f) digitizing the analog signal during a digitizing time in response to the interface control word; and (g) coupling the digitized signal to the system bus.

* * * * *